United States Patent
Brown et al.

(10) Patent No.: US 12,456,559 B2
(45) Date of Patent: Oct. 28, 2025

(54) COMPACT ASSEMBLY FOR PRODUCTION OF MEDICAL ISOTOPES VIA PHOTONUCLEAR REACTIONS

(71) Applicant: UCHICAGO ARGONNE, LLC, Chicago, IL (US)

(72) Inventors: Michael A. Brown, Chicago, IL (US); Jerry A. Nolen, Jr., Chciago, IL (US); Walter F. Henning, St. Charles, IL (US); David A. Rotsch, Montgomery, IL (US); Sergey D. Chemerisov, Lisle, IL (US); Jeongseog Song, Lisle, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 370 days.

(21) Appl. No.: 17/544,843

(22) Filed: Dec. 7, 2021

(65) Prior Publication Data

US 2022/0093283 A1    Mar. 24, 2022

Related U.S. Application Data

(62) Division of application No. 16/146,975, filed on Sep. 28, 2018, now Pat. No. 11,217,355.

(Continued)

(51) Int. Cl.
*G21K 5/08* (2006.01)
*G21G 1/00* (2006.01)
(Continued)

(52) U.S. Cl.
CPC .............. *G21G 1/10* (2013.01); *G21G 1/001* (2013.01); *G21G 1/12* (2013.01); *G21K 5/08* (2013.01);
(Continued)

(58) Field of Classification Search
CPC .............. G21G 1/00; G21G 1/10; G21G 1/12
See application file for complete search history.

(56) References Cited

U.S. PATENT DOCUMENTS

| 5,784,423 | A * | 7/1998 | Lidsky | ..................... G21G 1/10 |
| | | | | 376/156 |
| 6,208,704 | B1 * | 3/2001 | Lidsky | ..................... G21G 1/12 |
| | | | | 376/156 |

(Continued)

FOREIGN PATENT DOCUMENTS

DE    4106362 A1 *    9/1992    ............... G21K 1/10

OTHER PUBLICATIONS

O.D. Maslov, et al., Preparation of 225 AC by 226 Ra (y,n) Photonuclear Reaction on an Electron Accelerator, MT-25 Microtron, Radiochemistry, 2006, vol. 48, No. 2., pp. 195-197, Dubla, Moscow, Russia.

(Continued)

*Primary Examiner* — Sharon M Davis
(74) *Attorney, Agent, or Firm* — Foley & Lardner LLP

(57) ABSTRACT

The invention provides a method for generating medical isotopes, the method comprising contacting a primary radiation beam with a converter for a time sufficient to produce a secondary beam of gamma particles, and contacting the beam of gamma particles to a target, where the cross section dimension of the beam of gamma particles is similar to the cross section dimension of the target. Both the converter and target are small in diameter and very closely spaced. Also provided is a system for producing medical isotopes, the device comprising a housing having a first upstream end and a second downstream end, a radiotransparent channel (collimator) with a first upstream end and a downstream end, wherein the upstream end is adapted to receive a radiation beam, a target positioned downstream of the downstream (Continued)

end of the channel and coaxially aligned with the channel, wherein the target has a cross section that is similar to the cross section of the channel.

17 Claims, 4 Drawing Sheets

Related U.S. Application Data

(60) Provisional application No. 62/565,293, filed on Sep. 29, 2017.

(51) Int. Cl.
    *G21G 1/10*     (2006.01)
    *G21G 1/12*     (2006.01)

(52) U.S. Cl.
    CPC ............... *G21G 2001/0084* (2013.01); *G21G 2001/0089* (2013.01); *G21G 2001/0094* (2013.01)

(56) References Cited

U.S. PATENT DOCUMENTS

| | | | |
|---|---|---|---|
| 6,299,666 B1 | 10/2001 | Apostolidis et al. | |
| 6,907,106 B1 | 6/2005 | McIntyre et al. | |
| 9,202,602 B2 | 12/2015 | Nolen, Jr. et al. | |
| 2010/0091378 A1* | 4/2010 | Norman | G21K 1/02 359/641 |
| 2012/0281799 A1* | 11/2012 | Wells | G21G 1/12 376/157 |
| 2014/0348284 A1 | 11/2014 | Diamond et al. | |
| 2016/0040267 A1* | 2/2016 | Stoner | G21G 1/12 204/157.21 |
| 2017/0301426 A1* | 10/2017 | Diamond | H05G 2/00 |
| 2020/0023197 A1* | 1/2020 | Brown | G21K 5/10 |

OTHER PUBLICATIONS

S.N. Dmitriev, et al., Preparation of 226 Pu by the Reaction 237 Np(y,n), Radiochemistry, vol. 40, No. 6, 1998, pp. 553-557, Dubna, Russia.

\* cited by examiner

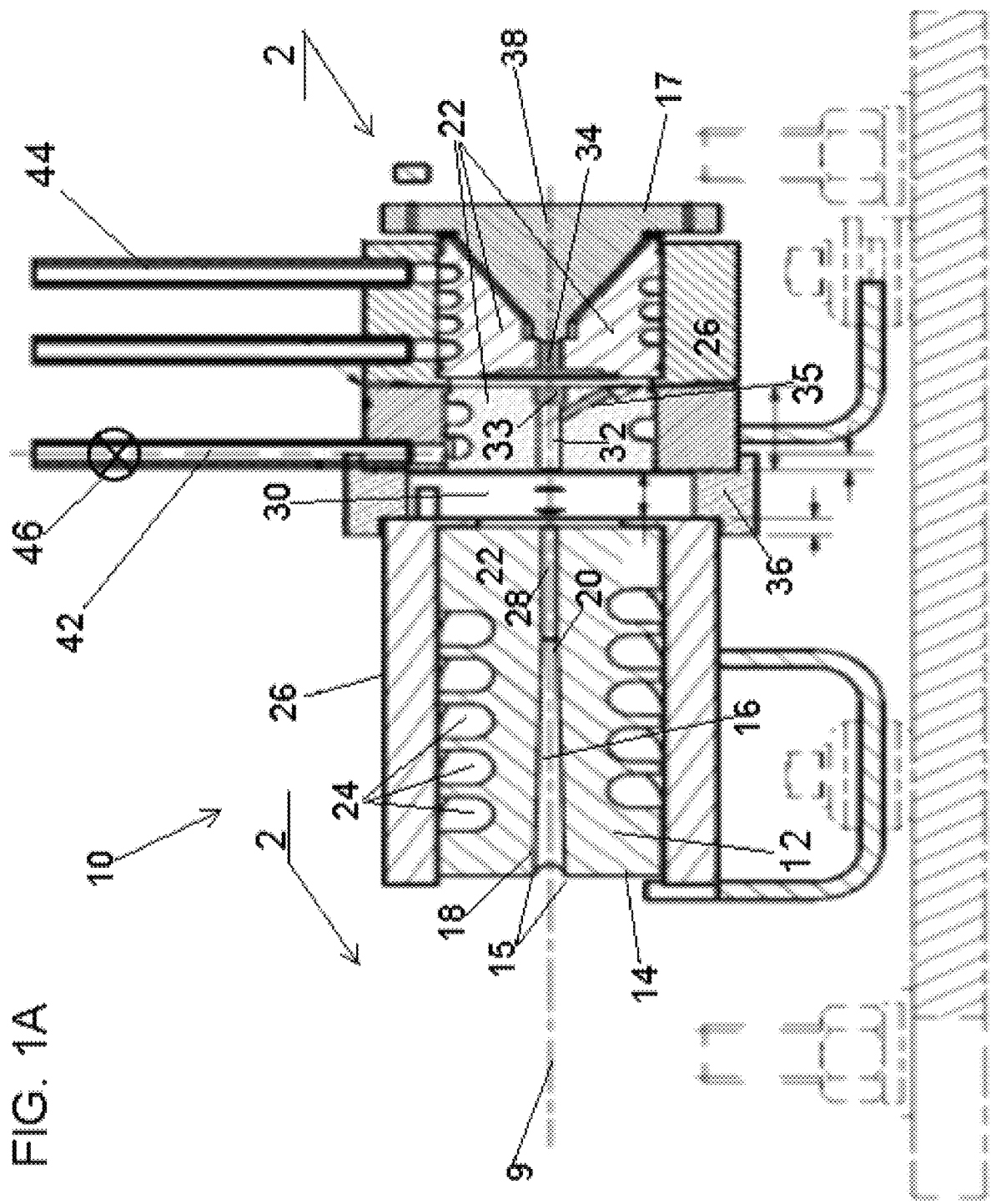

COMPACT ASSEMBLY FOR PRODUCTION OF MEDICAL ISOTOPES VIA PHOTONUCLEAR REACTIONS

PRIORITY

This Divisional Utility Patent Application claims the benefit of U.S. Utility patent application Ser. No. 16/146,975 filed on Sep. 28, 2018, which claimed the benefit of Provisional Patent Application No. 62/565,293, filed on Sep. 29, 2017, the entirety of which is incorporated by reference.

CONTRACTUAL ORIGIN OF THE INVENTION

The U.S. Government has rights in this invention pursuant to Contract No. DE-AC02-06CH11357 between the U.S. Department of Energy and Chicago Argonne, LLC, representing Argonne National Laboratory.

BACKGROUND OF THE INVENTION

1. Field of the Invention

This invention relates to medical isotope production and more specifically, this invention relates to a system and method for producing medical isotopes at efficiencies and production rates that are magnitudes higher than state of the art protocols.

2. Background of the Invention

Electron linear accelerators or LINACs are used widely through the medical world in various forms for radiation therapy and other applications. The electron beams may be used directly.

Alternatively, the electron beams may be converted to gamma beams upon collision with a converter comprising a high atomic number element. These secondary gamma beams are produced by a physical process called Bremsstrahlung (braking radiation) wherein incoming electrons are deflected, or accelerated, by nuclei of atoms in the converter material. The gamma beams can then be used to irradiate targets positioned downstream so as to produce medically important isotopes via photonuclear reactions.

Production of gamma beams of sufficient energy for such reactions requires electron linacs with electron beam energies up to about 40 MeV. The electron to gamma conversion process is very inefficient so that high electron beam power is generally needed to produce a high flux of gamma rays which in turn is needed to produce isotopes at a high rate.

In many cases, the target materials needed to produce desired isotopes are very rare and/or expensive. Hence, there is also the need to develop geometries for the production assembly that minimizes both the required beam power and the amount of the expensive or rare target material.

Medical isotopes which emit alpha particles are especially sought after for cancer treatment. The inherent benefits of alpha particles are that they have a high linear energy transfer (LET) in most materials, thereby delivering nearly all their energy within a very short distance (approximately 40-100 microns). Such isotopes can be incorporated in molecules to target tumors and kill cancer cells, which are in the size range of 2-120 microns. If targeted accurately, this treatment greatly reduces damage to surrounding healthy tissue, compared to methods of radiation treatment that employ either direct electron beams or gamma beams or medical isotopes which decay by beta particle emission.

(These other moieties are not of the high linear energy transfer (LET) variety and therefore much more penetrating. High LET radiation is very effective at killing DNA within tumor cells because it induces a large number of double strand breaks due to the high deposited energy density.)

Some medical isotopes are hard to make cost-effectively in useful amounts. Most existing methods require a combination of large amounts of isotopically enriched target material, high beam power, more expensive accelerators, and/or processing of large quantities of radioactive material. Hence, most existing solutions are too expensive, especially for certain therapeutic isotopes, such as 225Ac. For example, the U.S. Department of Energy currently extracts less than 1 Ci 225Ac per year from a large amount of radioactive material at a very high cost per mCi. Another method currently under development requires irradiation and chemical processing of large amounts of target material after radiation with high energy proton accelerators.

Medical isotopes produced using electron beams presently use electron to gamma converters which are thin plates of materials such as tantalum or tungsten immersed in flowing water for cooling. This limits the beam sizes to large diameters so as to prevent a concentration of energy on a smaller area that would otherwise boil the coolant water.

Impingement of the large diameter beams on the converter plates requires that the plates be followed by large diameter targets, upon which impinge gamma particles. The size of these targets require that they contain large amounts of enriched isotopes or otherwise rare materials, sometimes up to 50 to 100 grams. This is expensive.

A need exists in the art for a system and method for yielding large amounts of medical isotopes with very small amounts of target material, especially for cases in which the target material is very rare or expensive. The system should define a very small foot print. Preferably, the beam collimator, the electron-to-gamma converter, and the target are integrated into an optimized, compact assembly. To make maximum use of the gamma flux diverging from the converter, the distance between the converter and target material should be minimized. The resulting production assembly then would have a high yield of the desired isotope relative to the input beam power while, also, using a minimal amount of target material.

SUMMARY OF INVENTION

An object of the invention is to provide a system and method for producing medical isotopes that overcomes many of the drawbacks of the prior art.

Another object of the invention is to provide a system and method for efficiently producing medical isotopes. A feature of the invention is utilization of both small beam and target diameters such that the beam diameter is as small as the diameter of the target so that the entire area of the target is contacted by the beam. An advantage is that the very high power density results in efficiently producing medical isotopes with minimal total beam power and, also, a minimal amount of target material. The optimal beam and target diameters are determined by Monte Carlo simulations. Preferably, the optimal beam and target diameters are about 2-3 mm. Target diameter is small because of the small mass of the target. In an embodiment of the invention, the beam cross section or diameter is about the same as the cross section or diameter of the target. Alternatively, the beam is relatively smaller in cross section or diameter by ~10 percent to 30 percent. For example, a 3 mm diameter target may be contacted by a 2 mm diameter beam.

The invention also incorporates a method of cooling the collimator and converter that enables delivering the required beam power into the required small diameter spot. In an embodiment of the invention, the converter does not directly contact the coolant. For example the converter is not directly immersed in coolant water.

Still another object of the invention is to provide a method for cooling a system for producing medical isotopes, so that the system can utilize high energy densities. A feature of the invention is an optimized cooling configuration whereby the collimator, converter and target container are maintained at or below their respective melting points. The collimator module, converter module and target module are independent but well aligned with each other and spaced closely to form an overall compact system. Water cooling is applied at a distance such that the water does not boil. The materials directly irradiated by both the primary electron and secondary gamma beams are chosen to have the required physical properties such as high melting point and high thermal conductivity. Optionally, the assembly may be operated in an inert atmosphere or high vacuum such that the materials do not corrode via chemical reactions with the surrounding air. An advantage of the invention is that very high power densities can be utilized to produce large amounts of medical isotope from relatively low electron beam power, narrow beam widths, and small amounts of target material.

Yet another object of the present invention is to provide a compact device for producing medical isotopes. A feature of the device is its integration of a beam viewer, collimator, an electron-to-gamma converter, and target material into a single, compact nacelle. An advantage of the invention is that it yields large amounts of medical isotopes using photonuclear reactions with relatively low beam power (approximately 10-20 kW) and small amounts of target material (approximately from 50 milligrams to a few grams).

Briefly, the invention provides a method for generating medical isotopes, the method comprising contacting a radiation beam with a converter for a time sufficient to produce a beam of gamma particles, and contacting the beam of gamma particles to a target, where the cross section dimension of the beam of gamma particles is similar to the cross section dimension of the target. An example of the method is directing a small diameter electron beam to a converter material to produce a secondary beam of gamma particles which, in turn, impinge upon a down-stream target, where the cross section dimension of the beam of gamma particles is similar to the cross section dimension of the target. Since the gamma beam diverges from the converter material, it is necessary to minimize the distance separating the converter from the target. Also, since a large amount of energy is deposited by the electron beam in the converter material, while a much smaller amount is deposited in the target material (mostly by the gamma flux), these 2 components must not be in thermal contact.

Also provided is a system for producing medical isotopes, the system having a first upstream end and a second downstream end; a radiotransparent channel with a first upstream end and a downstream end, wherein the upstream end is adapted to receive a radiation beam; and a target positioned downstream of the downstream end of the channel and coaxially aligned with the channel, wherein the target has a cross section that is similar to the cross section of the channel.

BRIEF DESCRIPTION OF DRAWING

The invention together with the above and other objects and advantages will be best understood from the following detailed description of the preferred embodiment of the invention shown in the accompanying drawings, wherein:

FIG. 1A is a schematic elevational view of a compact system for generating isotopes, in accordance with features of the present invention;

DETAILED DESCRIPTION OF THE INVENTION

Figure 1B:
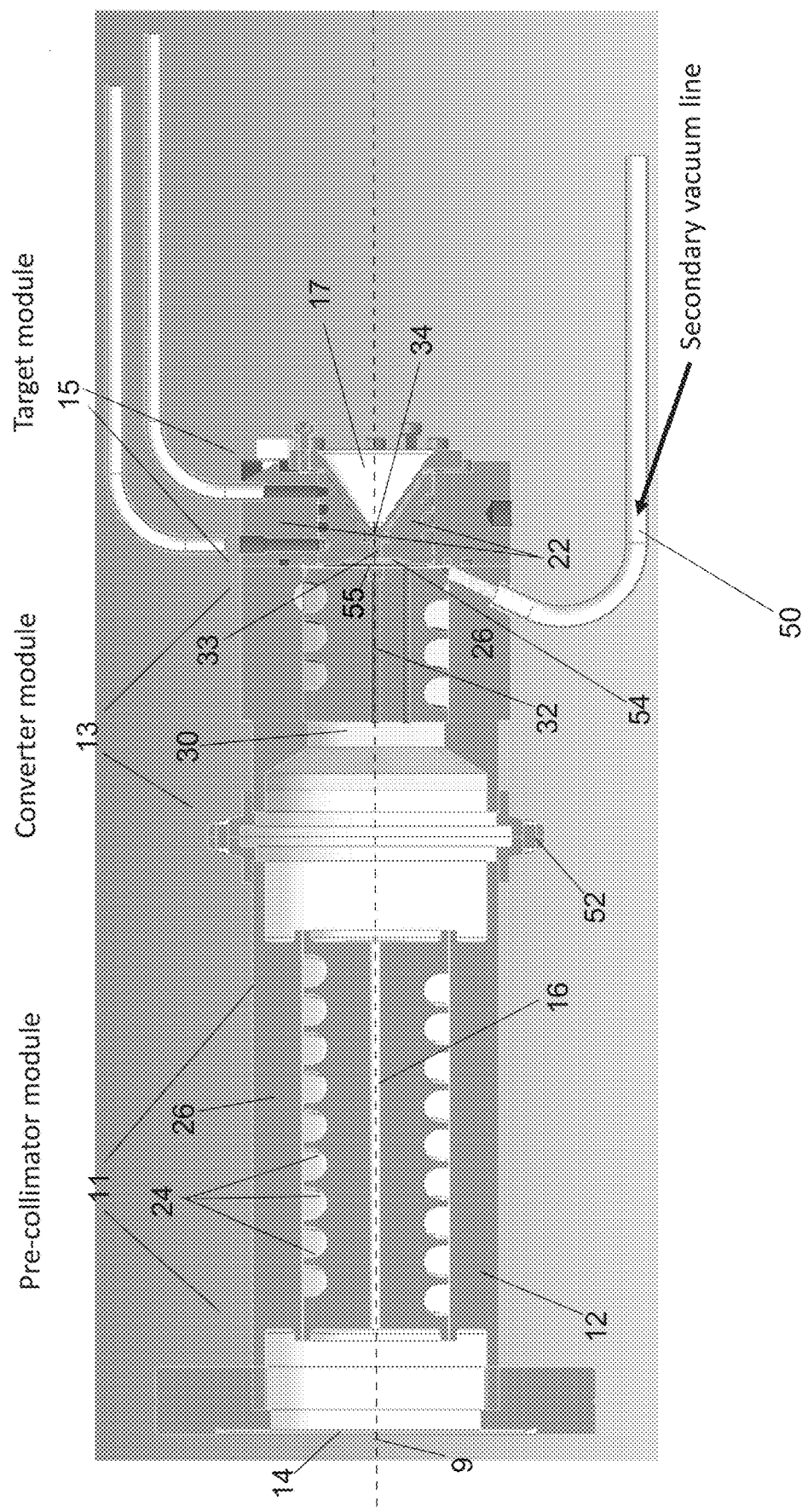
FIG. 1B is a schematic elevational view of a similar compact system for generating isotopes, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method for generating medical isotopes, the method comprising delivering an electron beam from an accelerator to impinge upon a converter to produce a secondary beam of gamma particles. The beam of gamma particles travel on to a target in which photonuclear reactions transmute nuclei of the target to produce atoms of the sought after medical isotope. The target is located as close as possible to the converter so that the diameters of both the gamma beam and target are similar (within 25 percent, preferably within 15 percent, and most preferably within 5 percent) to the diameter of the original electron beam. It is most effect to have the beam diameter no larger than the target diameter. For example, if the target is 100 units in diameter, the beam may vary from 75 to 100 units in diameter, and most preferably from 80 to 100 units.

The invention provides high yield, efficient production of medical isotopes using photonuclear reactions. For example, electron beams are used in conjunction with very small targets comprising rare target materials such as 226Ra. The invention's primary purpose is the production of a medical isotope 225Ac and its daughter 213Bi, both of which can be used for cancer therapy. However, the invention is applicable to producing increased levels of other isotopes which heretofore require large amounts of separated isotopes as target material. Also, aside from producing 225Ac, the invented method and system also can economically produce 224Ra/212Pb simultaneously in the same 226Ra target. In general the method has advantages for any photonuclear reactions that require very rare or expensive target materials, such as 48Ca.

Simulations of various isotopes have determined that the system can generate in one irradiation: 225Ac, also 225Ra/225Ac/213Bi as a generator, and a 224Ra/212Pb generator. In summary, final products can be the 3 alpha emitters: 225Ac, 213Bi, and 212Pb.

FIG. 1 depicts the invented system, generally designated as numeral 10. The system is an assembly of 3 modules, first a collimator module, second a converter module, and third a target module. The three modules are thermally isolated but arranged in close proximity to each other to maximize yields of the produced isotope. The distance from the collimator to the converter is not critical, but the distance from the converter to the target should be minimized to achieve high yields per unit of target material. Accurate axial alignment of the 3 modules is guaranteed mechanically.

FIG. 1A depicts a collimator 12 with a first upstream end 14 and a second downstream end 17. The housing contains virtually all of the components of the invented system and is designed for compactness. As such, the footprint of the housing is approximately 10 cm long by 5 cm wide. The upstream end 14 is adapted to receive an incoming radiation beam 9. This upstream end 14 may define a window 15 defining a frusto-conical shaped channel 16 with a first upstream end 18 and a second downstream end 20. The first end of the channel 16 defines a wider cross section than the second end so as to distribute the outer portion of the impinging electron beam 9 over a larger area of the collimator.

FIG. 1B is a cross section of a similar structure, sans the frusto-conical shaped channel (element 16 in FIG. 1A). Generally, FIG. 1B is identical in function with the collimator depicted in FIG. 1A. However, the collimator depicted in FIG. 1B features a secondary vacuum line, 50. This vacuum line is positioned at the downstream end 17 of the collimator. The assembly is connected to the electron beam vacuum pipe on the upstream side. A vacuum is also created in the small space between the converter (tungsten) and a thin titanium "window" on the downstream target side. This small space is pumped via a "closed" vacuum system for radiation safety reasons. In case of a breach of the target window no radiation will be released to the environment.

FIG. 1B also features a different means for coupling the precollimator module to the converter module, that means designated as numeral 52, and comprising a semi rigid band such as a "quick disconnect" flange. This quick disconnect feature allows the collimator module to remain in place while the converter/target assembly is removed for off-line processing in a hot cell. By contrast, FIG. 1A comprises a bolt/threaded aperture configuration integrally molded with its interlocking collar 36 for coupling/decoupling the collimator from/to the converter/target assembly.

A salient feature of the invention is that the cross section of the target 34 is very similar in size to the cross section portion of the incoming radiation beam 9 which passes through the collimator 12 so as to utilize virtually the entire bulk of a typically very expensive target 34.

The channel 16 is encircled by a heat sink material 22 so as to be in physical contact with the material. Exemplary material is a metal selected from the group consisting of copper, Glidcop®, aluminum, and combinations thereof. Glidcop is the registered trademark name of North American Höganas, that refers to a family of copper-based metal matrix composite (MMC) alloys mixed primarily with aluminum oxide ceramic particles. The addition of small amounts of aluminum oxide has minuscule effects on the performance of the copper at room temperature (such as a small decrease in thermal and electrical conductivity), but greatly increases the copper's resistance to thermal softening and enhances high elevated temperature strength. The addition of aluminum oxide also increases resistance to radiation damage. As such, the alloy has found use in applications where high thermal conductivity or electrical conductivity is required while also maintaining strength at elevated temperatures.

Peripheral regions of the heat sink material 22 define channels 24 adapted to receive coolant fluid, such that the channels encircle the beam 9 at a radially displaced position, relative to the beam. The typical cooling fluid is water entering at a temperature ~25 degrees C. and exiting at a temperature less than 100 degrees C. The heat sink material 22 may be encircled by cladding material 26 such that radial aspects of the channels 24 terminate in medially facing surfaces of the cladding material. In this configuration, coolant coursing through the channels 24 are in simultaneous physical (and therefore thermal contact) with both the heat sink material 22 and the cladding 26. (The cladding material may also be similar to the heat sink material, which is to say copper, aluminum, Glidcop, etc.) The coolant channels may encircle substantially the entire length of the channel 16, or at least enough of it to prevent its melting during system operation.

The second downstream end 22 of the channel terminates at an upstream end of a tubular shaped extension 28. The cross section diameter of this tubular shaped extension is similar to the cross section diameter of the target 34 situated further downstream.

This tubular shaped extension 28 is similarly encircled by downstream regions of the heat sink material 22. However, these downstream regions of the heat sink material may or may not form coolant channels in their peripheries along the entire length of the tubular extension 28. The highest energy density in the entire assembly is in the converter. The water cooling of the converter module must carry away this energy.

The channel 16 and its downstream tubular extension 28 combine to form a continuous radio-transparent conduit through which the beam 9 may travel. The downstream end of the tubular extension 28 terminates in a cavity 30. The beam diameter entering the collimator at its upstream aperture or iris 15 could typically be about 3 mm while the beam exiting will be the diameter of the tubular region 20-28 and so typically about 2 mm. Beam collimation ensures that only useful beam enters the converter module. Beam of larger diameter than the collimator aperture is generally not preferred as such a wide beam deposits its energy in the collimator body and this energy is carried away by the water cooling of the collimator. This can be somewhat ameliorated by the frustoconical shape of the beam channel featured in FIG. 1A.

Positioned downstream from the cavity 30 is heat sink material 22 similar to the aforementioned heat sink material 22 encircling the channel 16. Portions of this downstream heat sink material define an aperture 32 coaxial with the channel 16, also previously described. The aperture 32 extends completely through the downstream heat sink material 22 and terminates at its downstream end at a point proximal with a converter 33. This downstream target module 15 is reversibly and rigidly attached to the upstream collimator module 11 via an interlocking collar 36. Peripheral regions of the collar may define apertures aligned with threaded apertures formed in peripheral regions of the heat sink 22 and/or cladding 26. These apertures are adapted to receive bolts so as to removably attach the collar to the cladding.

A salient feature of the invention is that the converter 33 is in physical contact (for example by brazing) with the heat sink material 22, the latter of which is cooled via coolant flowing about the periphery of the heat sink material 22. All but an upstream facing surface of the converter is embedded into the heat sink material 22 so as to maximize thermal conductance between the converter and surrounding cladding material 22. The upstream facing surface of the converter 33 is in fluid communication with the channel, channel extension 28 and the downstream heat sink aperture 32. This configuration results in the converter being isolated from any coolant fluid such that no coolant fluid (such as water) contacts the converter 33. This feature enables operation of the converter at temperatures much higher than the boiling point of water which is a limiting feature of converter assemblies comprising thin plates immersed in flowing water.

Optionally, the upstream facing surface of the converter 33 may be bathed in a relatively inert fluid (e.g., a gas such as argon, helium, nitrogen) so as to prevent exposure of the converter to air. The inert fluid (such as a gas) may be supplied via the distal end of an inert fluid conduit 35, that distal end positioned in close spatial relationship to the upstream facing surface of the converter. A proximal end (not shown) of the conduit 35 would be in fluid communication with an inert gas supply (also not shown). The inert gas can exit through the collimator channels 16, 20, 28. Furthermore, the inert fluid may be provided at a temperature below ambient temperature so as to further aid in maintaining the converter at a predetermined temperature (e.g., the converter melting point). In an embodiment, the upstream collimator and converter modules are contained within the electron linac beam vacuum and there is a small vacuum space 54 (FIG. 1B) between the downstream side of the converter and the thin window 55 in front of the target. Alternatively, this small space can contain flowing inert gas within a closed system to ensure no radiation is released as described above for the embodiment using a closed vacuum system.

The target 34 is positioned downstream from the converter 33 and may be separated by a thin space so as to not contact the converter. A downstream surface of the target is shown in FIG. 1A as being backstopped and otherwise in physical contact with a frustoconically shaped end cap 38. (The conical shape is one possible method to enable more convenient loading of radioactive target material such as 226Ra via a remote manipulator in a hot cell.)

Peripheral regions of the end cap 38 may define apertures in alignment with similarly sized threaded apertures along the periphery of a downstream facing surface of the cladding 26. These apertures are adapted to receive threaded bolts so as to removably attach the cap 38 to the second end 17 of the system.

Suitable coolant fluid is that which has a boiling point of at least 100 C, usually water. As such, a myriad of coolants may be utilized, including but not limited to water, polyethylene glycol, other alcohols, subcritical fluids and combinations thereof. Longitudinally extending exterior surface regions of the cladding 26 may define a first means of coolant ingress 42 while a second portion of the cladding 26 may form a first means of coolant egress 44. Suitable means include conduit or piping as depicted in FIG. 1. The coolant may be supplied under pressure and recirculated via a pump after passing through an external heat exchanger. Alternatively, the coolant may be drawn into the housing via a negative pressure applied to the depending end of the coolant egress conduit 24. The means of ingress 42 and/or egress 44 may include a valve 46 to control fluid flow into and out of the housing.

Flow rate of the fluid is empirically determined, so as to prevent liquid fluid from vaporizing or appreciably increasing in temperature to the point of creating a pressure breach, or physical compromise to components of the system. The collimator module and the converter module are separately limited in temperature by a coolant at their outer diameters. The target module is similarly cooled.

Unlike state of the art systems, only small amounts of isotopically pure target are required. The inventors have determined through detailed simulations that about 100 mg of 226Ra target material is required to produce about 1 Ci of 225Ac, for example, using a 10-kW electron beam through a 2 mm diameter collimator onto the converter during a 5-day irradiation.

Energy/Power Density Detail

This new geometry overcomes the power density limitations of conventional converter plates immersed in water.

Generally, radiation energies of between about 10 kW and about 20 kW are provided.

In operation, an incoming electron beam 9 is provided that has just slightly less diameter or cross section as the target 34. This assures that virtually all of the target (e.g. 226Ra) is contacted by the secondary gamma beam. It is this feature that results in a more than 16-fold increase in production of desired medical isotope at the same beam power and target mass as the present art. For example, the beam 9 may have a diameter at the converter of 2 mm and the target 34 located immediately behind the converter may have a cross section diameter of 3 mm.

The beam 9 travels through the channel 16, tubular extension 38 and downstream aperture 32 to impinge upon the converter. The secondary gamma beam diverges slightly from the converter to impinge upon the slightly larger target located immediately behind the converter.

Upon conversion, the secondary radiation as gamma particles impinge upon the target, inducing nuclear transmutation of some target atoms to the medical isotope of interest. During the entire process, a coolant serves as a heat sink to maintain the components of the system at below the boiling point of the coolant. Specifically, the coolant carries away the energy deposited in the three separate modules 11, 13, 15. The radius of the coolant channels is adjusted in the design simulations to ensure enough surface area to keep the coolant temperature below its boiling point. Suitable coolant is that which maintains system temperature below the melting point of its lowest melting point component.

Example

Alpha particle-emitting isotopes are cytotoxic agents for enabling targeted therapy. Properties of alpha particle radiation such as their limited range in tissue of a few cell diameters and their high linear energy transfer leading to dense radiation damage along each alpha track are promising in the treatment of cancer, especially when single cells or clusters of tumor cells are targeted. Actinium-225 ($^{225}$Ac) is an alpha particle-emitting radionuclide that generates 4 net alpha particle isotopes in a short decay chain finally leading to stable $^{209}$Bi.

More than a Curie of the alpha emitter 225Ac can be produced using this invention from 100 mg of 226 Ra target. The transmutation is initiated with a photo-neutron reaction as depicted in Equation 1, below:

$$226Ra + \gamma \rightarrow 225Ra + n \qquad \text{Equation 1}$$

A photon of significant energy (>6.4 MeV) liberates a neutron from Ra-226, leaving a Ra-225 atom. Ra-225 then undergoes natural radioactive beta decay (half-life 14.9 days) to Ac-225, as indicated in Equation 2, below:

$$225Ra \rightarrow 225Ac + \beta \qquad \text{Equation 2}$$

The radioactive isotope 225Ra can be accumulated during a 5-day irradiation using only 10 kW of beam power on the converter. With the assembly shown in FIG. 1A or 1B, the 10-kW beam on the converter for about 5 days will produce ~1 Ci of 225Ra and 0.1 Ci of 225Ac. As 225Ra decays to produce more 225Ac, the 225Ac can be extracted via "milking" of the Ac from Ra via an ion-exchange resin. After several such milkings of ~100-200 mCi of 225Ac, an integrated yield of >1 Ci of 225Ac is available for therapeutic use (see below).

Table 1 below itemizes yields of photonuclear production of 225Ac from 100 mg of 226Ra target. At the end of the 5-day run 1.1 Ci of 225Ra is produced. 225Ra has a half-life of 15 days and decays to 225Ac which has a half-life of 10 days. The table indicates that the 226Ra is irradiated for 5 days. Then after 2 more days on day 7, the total accumulated amount of 225Ac is 292 mCi. Then on the 7th day 292 mCi of 225Ac can be "milked," i.e. extracted from the 226Ra target. Then additional amounts of 225Ac can be milked from the target once every few days due to the continuing decay of 225Ra to 225Ac. Finally, after 8 "milkings" a total of >1 Ci of 225Ac can be extracted from the initial about 1 Ci of 225Ra, as indicated at the bottom of the table.

The 225Ac produced is free of 227 Ac contamination because the gamma beam can knock a neutron from the 226Ra target, but not cause a neutron to be absorbed to make 227Ra which would decay to 227Ac. Other methods of producing 225Ac can simultaneously produce 227Ac as an impurity.

TABLE 1

Photonuclear Production of 225 AC from 100 mg of 226 Ra

| | Day | 225 Ac (mci) | Deliveries | |
|---|---|---|---|---|
| Start Run | 0 | | | |
| Stop Run | 5 | | | |
| Milk 1 | 7 | 292.0 | | |
| Milk 2 | 10 | 185.9 | | |
| Milk 3 | 13 | 161.7 | | |
| Milk 4 | 17 | 176.8 | | |
| Milk 5 | 22 | 173.1 | | |
| Milk 6 | 28 | 155.3 | | |
| Milk 7 | 33 | 155.2 | 1144.9 | mCi from a 5-day once per month |
| Milk 8 | 48 | 100.8 | | |
| Total | | 1400.9 | 1400.9 | mCi from a 5-day run every 2 months |

"Milking" is the process of extracting the accumulated quantity of the short-lived daughter product of the decay of the longer-lived initial material, e.g. the 10 day half-life 225Ac from the mother isotope 15-day half-life 225Ra material. This can be done many times until the initial mother isotope has decayed away.

Figure 2:
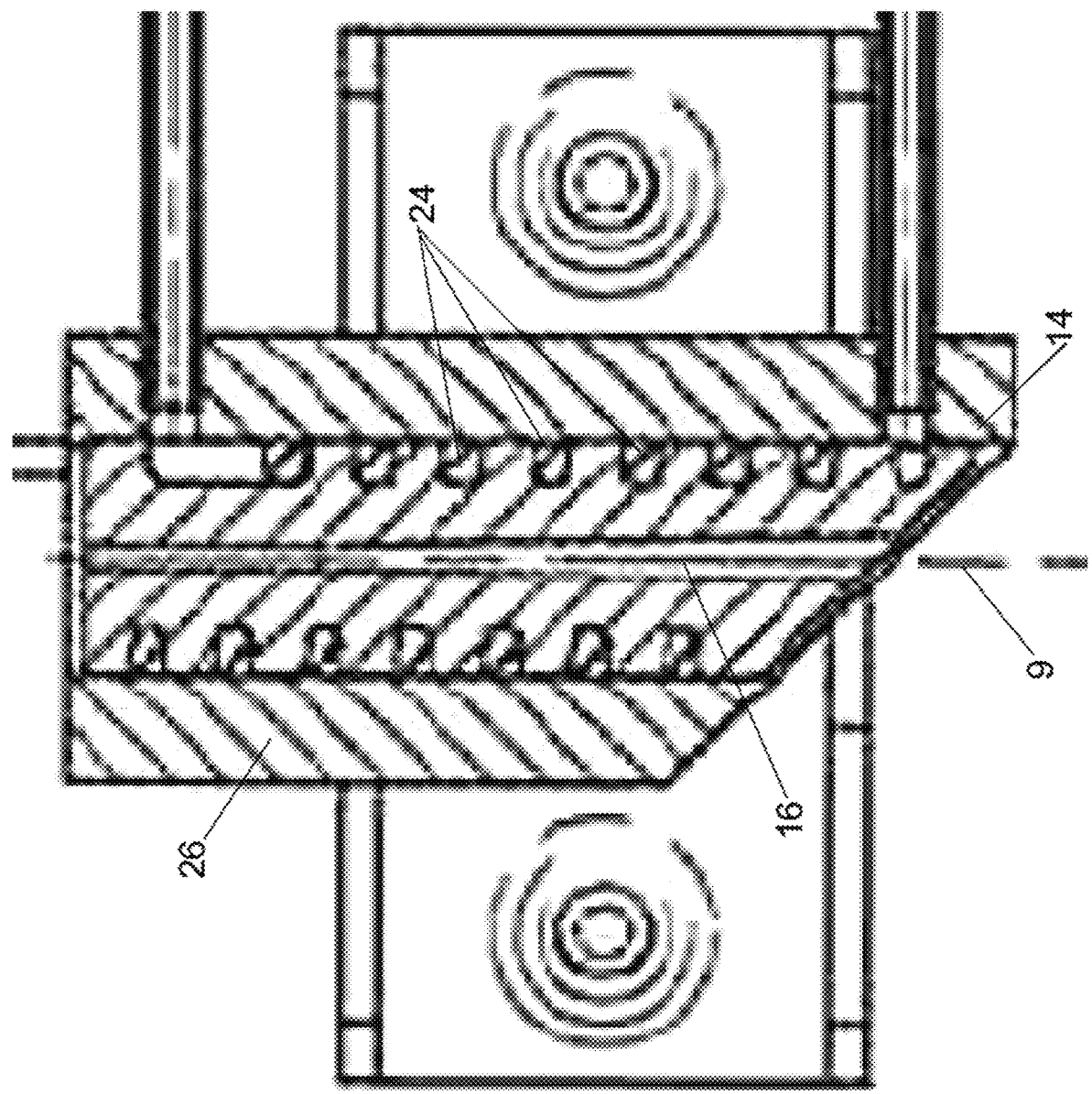
FIG. 2 is a view of the compact system taken along line 2-2 of FIG. 1, in accordance with features of the present invention.

FIG. 2 is a plan view of the invented system, taken along lines 2-2 of FIG. 1. In an embodiment of the invention, the collimator module is shown beveled at an angle, typically 45 degrees. The beam halo surrounding the small diameter collimator aperture causes "visible optical transition radiation" which enables viewing of the beam at the edges of the collimator opening in order to ensure the high-power beam is centered on the entrance to the collimator. This visible radiation is viewed via a shielding video camera viewed using a mirror in the beamline upstream of the collimator.

Figure 3:
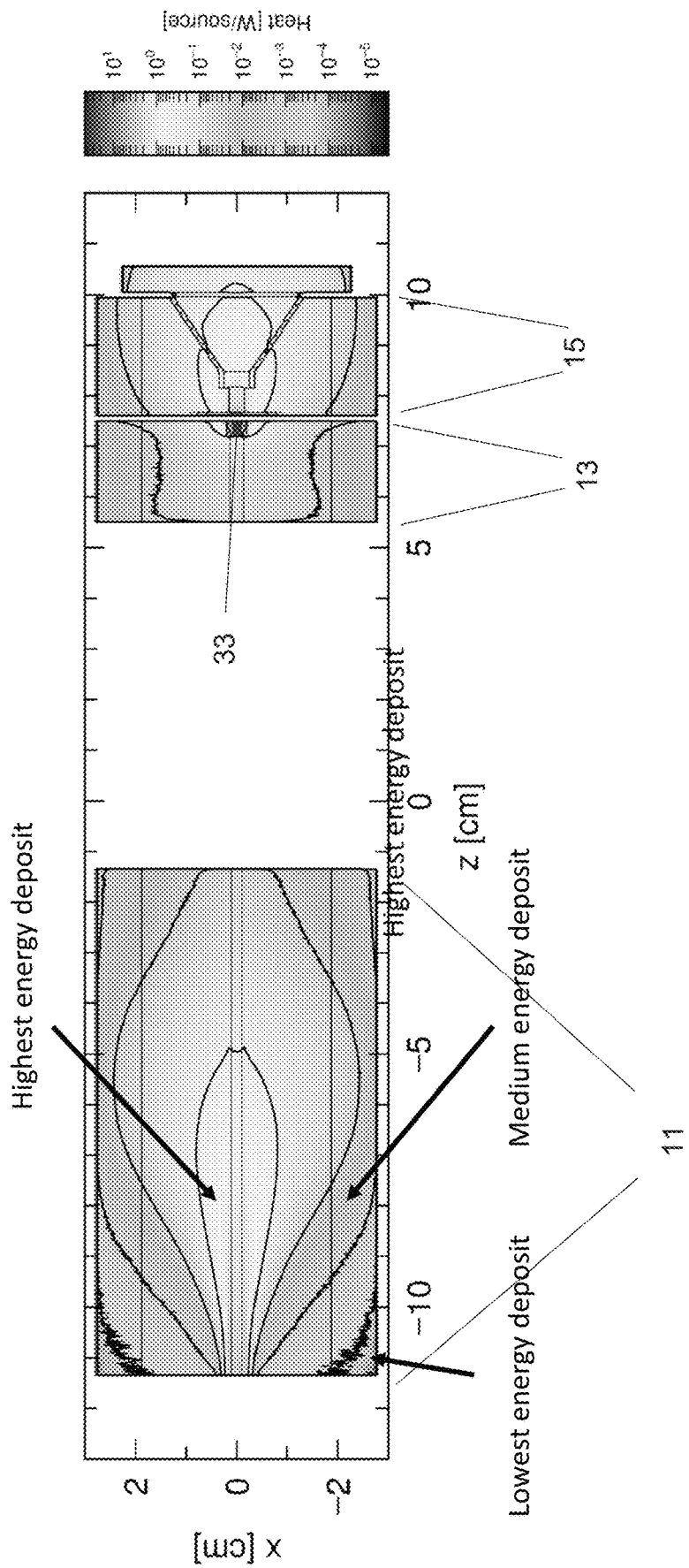
FIG. 3 is a depiction of temperature gradients of the compact system depicted in FIG. 2, in accordance with features of the present invention.

FIG. 3 depicts the heat dissipation characteristics of the collimator, converter and target modules of the invented system, along the same view as FIG. 1. Similar simulations have been done for the converter module and the target module. Less heat is generated in the precollimator module 11 of the device, compared to the converter module 13 and target module 15. The highest energy density is deposited in the converter 33. About 4 kW of the 10 kW transmitted through the collimator to the converter are deposited in the converter. The remaining 6 kW represents the power converted to gamma rays. The peak temperature in the converter is about 1000° C. which is well under the melting point of tungsten. At the outer diameter of the tungsten converter, the temperature is well under the melting point of the braze material. Also, the temperature at the larger radius of the aluminum, copper or Glidcop where the cooling channels are located, is under the boiling point of water.

EXAMPLE

This example is based on simulated data. The primary purpose of this simulation is to produce >1 Ci/week of 225Ac (10 day half-life).

A co-produced isotope that is also of great interest is 212Pb (10 hour half-life) which will be available at greater than 10 Ci/week.

These yields are based on an assumed beam power of 11 kW of 40-MeV electron beam for 5 days on the tungsten converter followed by a 125 mg 226Ra target.

The 225Ac is "milked" every few days from the irradiated target in which 225Ra is produced by the photonuclear reaction 226Ra(γ,n)225Ra (15 day half-life). The 225Ac product is pure, i.e. no 227Ac is co-produced. Hence, the 225Ac can be used therapeutically directly or used as a generator of the shorter lived therapeutic alpha emitter 213Bi (46 minute half-life). More than 50 Ci of 213Bi can be extracted via milking the 1 Ci of 225Ac due to the large half-life difference.

The 212Pb (10 hour half-life) alpha emitter is the daughter of 224Ra (3.6 day half-life) which is produced at the activity level of ~4 Ci in the same 5-day irradiation. A total of ~10 Ci of 212Pb can be milked from the irradiated 226Ra target.

That is, the 125 mg 226Ra target irradiated for 5 days as described above can provide >1 Ci of 225Ac or 50 Ci of 213Bi, and simultaneously >10 Ci of 212Pb as the result of successive milkings of the same target using different ion exchange columns.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for producing medical isotopes, the system comprising:
    a) a collimator module with an upstream end and a downstream end comprising a solid collimator heat sink defining a radiotransparent channel extending from the upstream end to the downstream end, the channel having a diameter, wherein the upstream end receives a radiation beam having a first cross-section, and the radiation beam passes through the channel from the upstream end to the downstream end;
    b) a converter module comprising a converter positioned downstream of the collimator module, the converter module comprising a solid converter heat sink defining an aperture coaxial with the channel and terminating at a point proximal with the converter; and
    c) a target module positioned downstream of the converter module, the target module comprising a target having a second cross-section and coaxially aligned with the channel and the aperture, wherein a front face of the target that faces the downstream end of the collimator module has a circular area with a diameter equal to the diameter of the channel, and a solid target heat sink in thermal communication with the target.

2. The system as recited in claim 1 wherein the converter and the front face of the target are protected from degradation by air by being bathed in a vacuum or an inert fluid.

3. The system as recited in claim 1 wherein the each solid heat sink comprises fluid channels in communication with a first fluid conduit and a second fluid conduit.

4. The system as recited in claim 3 wherein the first fluid conduit provides a means of ingress or egress for a coolant fluid.

5. The system as recited in claim 3 wherein the second fluid conduit provides a means of ingress or egress for a coolant fluid.

6. The system as recited in claim 3 wherein a coolant fluid courses through the fluid channels in each solid heat sink.

7. The system as recited in claim 6, wherein the converter is isolated from the coolant fluid.

8. The system as recited in claim 1 wherein the target is an enriched or single isotope and has a mass of between 50 mg and 5 g.

9. The system as recited in claim 1 wherein the collimator module, the converter module, and the target module are and the target are reversibly coupled to each other to enable off-line processing of the target.

10. The system as recited in claim 1 wherein the collimator module has a first window to receive the radiation beam to produce a collimated beam and the target module has a second window to receive the collimated beam.

11. The system as recited in claim 1 wherein the radiation beam and target diameters are 2-3 mm.

12. The system as recited in claim 1 wherein the first cross-section is 10 percent to 30 percent smaller than the second cross-section.

13. The system as recited in claim 1 wherein the radiation beam has a power of 10 KW, the target is 226Ra, the weight of the target is 100 mg, and the channel diameter is 2 mm.

14. The system as recited in claim 1, wherein the converter is in physical contact with the solid converter heat sink.

15. The system as recited in claim 1, wherein the converter is embedded in the solid converter heat sink.

16. The system as recited in claim 1, further comprising a collar disposed between the collimator module and the converter module.

17. The system as recited in claim 16, wherein the collar comprises a cavity.

\* \* \* \* \*